(12) United States Patent
Baruch et al.

(10) Patent No.: US 10,235,087 B1
(45) Date of Patent: Mar. 19, 2019

(54) DISTRIBUTING JOURNAL DATA OVER MULTIPLE JOURNALS

(71) Applicant: EMC Corporation, Hopkinton, MA (US)

(72) Inventors: Leehod Baruch, Rishon Leziyon (IL); Assaf Natanzon, Tel Aviv (IL); Jehuda Shemer, Kfar Saba (IL); Ron Bigman, Holon (IL); Amit Lieberman, Raanana (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 15/085,123

(22) Filed: Mar. 30, 2016

(51) Int. Cl.
  *G06F 12/00* (2006.01)
  *G06F 3/06* (2006.01)

(52) U.S. Cl.
  CPC ............ *G06F 3/065* (2013.01); *G06F 3/0619* (2013.01); *G06F 3/0689* (2013.01)

(58) Field of Classification Search
  CPC ...... G06F 11/1448; G06F 3/065; G06F 3/067; G06F 11/1471; G06F 11/1076; G06F 11/2074; G06F 3/0689
  See application file for complete search history.

(56) References Cited

U.S. PATENT DOCUMENTS

| | | | |
|---|---|---|---|
| 5,170,480 A | 12/1992 | Mohan et al. | |
| 5,249,053 A | 9/1993 | Jain | |
| 5,388,254 A | 2/1995 | Betz et al. | |
| 5,499,367 A | 3/1996 | Bamford et al. | |
| 5,526,397 A | 6/1996 | Lohman | |
| 5,860,091 A | 1/1999 | DeKoning et al. | |
| 5,864,837 A | 1/1999 | Maimone | |
| 5,879,459 A | 3/1999 | Gadgil et al. | |
| 5,990,899 A | 11/1999 | Whitten | |
| 6,042,652 A | 3/2000 | Hyun et al. | |
| 6,065,018 A | 5/2000 | Beier et al. | |
| 6,143,659 A | 11/2000 | Leem | |
| 6,148,340 A | 11/2000 | Bittinger et al. | |
| 6,174,377 B1 | 1/2001 | Doering et al. | |

(Continued)

FOREIGN PATENT DOCUMENTS

| | | |
|---|---|---|
| EP | 1154356 | 11/2001 |
| WO | WO 00 45581 A3 | 8/2000 |

OTHER PUBLICATIONS

Gibson, "Five Point Plan Lies at the Heart of Compression Technology;" Tech Talk; Apr. 29, 1991; 1 Page.

(Continued)

*Primary Examiner* — Arvind Talukdar
(74) *Attorney, Agent, or Firm* — Daly, Crowley Mofford & Durkee, LLP (57) ABSTRACT

In one embodiment, a method includes replicating a production volume on a plurality of replica volumes. Each replica volume is stored on a respective storage array with a respective journal. The replicating includes writing data to a do stream of each journal written to the production volume, reading from the do stream of each journal, reading undo data that will be overwritten by the data in the do stream, distributing the undo data across the journals and writing the data from the do stream from each journal to the respective replica volume. A number of journals less than a total number of journals can be used to access data in a full journal.

16 Claims, 6 Drawing Sheets

(56) References Cited

U.S. PATENT DOCUMENTS

| | | |
|---|---|---|
| 6,174,809 B1 | 1/2001 | Kang et al. |
| 6,203,613 B1 | 3/2001 | Gates et al. |
| 6,260,125 B1 | 7/2001 | McDowell |
| 6,270,572 B1 | 8/2001 | Kim et al. |
| 6,272,534 B1 | 8/2001 | Guha |
| 6,287,965 B1 | 9/2001 | Kang et al. |
| 6,467,023 B1 | 10/2002 | DeKoning et al. |
| 6,574,657 B1 | 6/2003 | Dickinson |
| 6,621,493 B1 | 9/2003 | Whitten |
| 6,804,676 B1 | 10/2004 | Bains, II |
| 6,947,981 B2 | 9/2005 | Lubbers et al. |
| 7,043,610 B2 | 5/2006 | Horn et al. |
| 7,051,126 B1 | 5/2006 | Franklin |
| 7,076,620 B2 | 7/2006 | Takeda et al. |
| 7,111,197 B2 | 9/2006 | Kingsbury et al. |
| 7,117,327 B2 | 10/2006 | Hirakawa et al. |
| 7,120,768 B2 | 10/2006 | Mizuno et al. |
| 7,130,975 B2 | 10/2006 | Suishu et al. |
| 7,139,927 B2 | 11/2006 | Park et al. |
| 7,159,088 B2 | 1/2007 | Hirakawa et al. |
| 7,167,963 B2 | 1/2007 | Hirakawa et al. |
| 7,203,741 B2 | 4/2007 | Marco et al. |
| 7,222,136 B1 | 5/2007 | Brown et al. |
| 7,296,008 B2 | 11/2007 | Passerini et al. |
| 7,328,373 B2 | 2/2008 | Kawamura et al. |
| 7,353,285 B2 | 4/2008 | Bai et al. |
| 7,353,335 B2 | 4/2008 | Kawamura |
| 7,360,113 B2 | 4/2008 | Anderson et al. |
| 7,426,618 B2 | 9/2008 | Vu et al. |
| 7,464,126 B2 | 12/2008 | Chen |
| 7,519,625 B2 | 4/2009 | Honami et al. |
| 7,519,628 B1 | 4/2009 | Leverett |
| 7,546,485 B2 | 6/2009 | Cochran et al. |
| 7,590,887 B2 | 9/2009 | Kano |
| 7,606,940 B2 | 10/2009 | Yamagami |
| 7,719,443 B1 | 5/2010 | Natanzon |
| 7,757,057 B2 | 7/2010 | Sangapu et al. |
| 7,797,358 B1 | 9/2010 | Ahal et al. |
| 7,840,536 B1 | 11/2010 | Ahal et al. |
| 7,840,662 B1 | 11/2010 | Natanzon |
| 7,844,856 B1 | 11/2010 | Ahal et al. |
| 7,860,836 B1 | 12/2010 | Natanzon et al. |
| 7,882,286 B1 | 2/2011 | Natanzon et al. |
| 7,934,262 B1 | 4/2011 | Natanzon et al. |
| 7,958,372 B1 | 6/2011 | Natanzon |
| 8,037,162 B2 | 10/2011 | Marco et al. |
| 8,041,940 B1 | 10/2011 | Natanzon et al. |
| 8,060,713 B1 | 11/2011 | Natanzon |
| 8,060,714 B1 | 11/2011 | Natanzon |
| 8,103,937 B1 | 1/2012 | Natanzon et al. |
| 8,108,634 B1 | 1/2012 | Natanzon et al. |
| 8,205,009 B2 | 6/2012 | Heller et al. |
| 8,214,612 B1 | 7/2012 | Natanzon |
| 8,250,149 B2 | 8/2012 | Marco et al. |
| 8,271,441 B1 | 9/2012 | Natanzon et al. |
| 8,271,447 B1 | 9/2012 | Natanzon et al. |
| 8,332,687 B1 | 12/2012 | Natanzon et al. |
| 8,335,761 B1 | 12/2012 | Natanzon |
| 8,335,771 B1 | 12/2012 | Natanzon et al. |
| 8,341,115 B1 | 12/2012 | Natanzon et al. |
| 8,370,648 B1 | 2/2013 | Natanzon |
| 8,380,885 B1 | 2/2013 | Natanzon |
| 8,392,680 B1 | 3/2013 | Natanzon et al. |
| 8,429,362 B1 | 4/2013 | Natanzon et al. |
| 8,433,869 B1 | 4/2013 | Natanzon et al. |
| 8,438,135 B1 | 5/2013 | Natanzon et al. |
| 8,464,101 B1 | 6/2013 | Natanzon et al. |
| 8,478,955 B1 | 7/2013 | Natanzon et al. |
| 8,495,304 B1 | 7/2013 | Natanzon et al. |
| 8,510,279 B1 | 8/2013 | Natanzon et al. |
| 8,521,691 B1 | 8/2013 | Natanzon |
| 8,521,694 B1 * | 8/2013 | Natanzon .............. G06F 3/0601 707/649 |
| 8,543,609 B1 | 9/2013 | Natanzon |
| 8,583,885 B1 * | 11/2013 | Natanzon ............. G06F 11/2074 711/162 |
| 8,600,945 B1 | 12/2013 | Natanzon et al. |
| 8,601,085 B1 | 12/2013 | Ives et al. |
| 8,627,012 B1 | 1/2014 | Derbeko et al. |
| 8,683,592 B1 | 3/2014 | Dotan et al. |
| 8,694,700 B1 | 4/2014 | Natanzon et al. |
| 8,706,700 B1 | 4/2014 | Natanzon et al. |
| 8,712,962 B1 | 4/2014 | Natanzon et al. |
| 8,719,497 B1 | 5/2014 | Don et al. |
| 8,725,691 B1 | 5/2014 | Natanzon |
| 8,725,692 B1 | 5/2014 | Natanzon et al. |
| 8,726,066 B1 | 5/2014 | Natanzon et al. |
| 8,738,813 B1 | 5/2014 | Natanzon et al. |
| 8,745,004 B1 | 6/2014 | Natanzon et al. |
| 8,751,828 B1 | 6/2014 | Raizen et al. |
| 8,769,336 B1 | 7/2014 | Natanzon et al. |
| 8,805,786 B1 | 8/2014 | Natanzon |
| 8,806,161 B1 | 8/2014 | Natanzon |
| 8,825,848 B1 | 9/2014 | Dotan et al. |
| 8,832,399 B1 | 9/2014 | Natanzon et al. |
| 8,850,143 B1 | 9/2014 | Natanzon |
| 8,850,144 B1 | 9/2014 | Natanzon et al. |
| 8,862,546 B1 | 10/2014 | Natanzon et al. |
| 8,892,835 B1 | 11/2014 | Natanzon et al. |
| 8,898,112 B1 | 11/2014 | Natanzon et al. |
| 8,898,409 B1 | 11/2014 | Natanzon et al. |
| 8,898,515 B1 | 11/2014 | Natanzon |
| 8,898,519 B1 | 11/2014 | Natanzon et al. |
| 8,914,595 B1 | 12/2014 | Natanzon |
| 8,924,668 B1 | 12/2014 | Natanzon |
| 8,930,500 B2 | 1/2015 | Marco et al. |
| 8,930,947 B1 | 1/2015 | Derbeko et al. |
| 8,935,498 B1 | 1/2015 | Natanzon |
| 8,949,180 B1 | 2/2015 | Natanzon et al. |
| 8,954,673 B1 | 2/2015 | Natanzon et al. |
| 8,954,796 B1 | 2/2015 | Cohen et al. |
| 8,959,054 B1 | 2/2015 | Natanzon |
| 8,977,593 B1 | 3/2015 | Natanzon et al. |
| 8,977,826 B1 | 3/2015 | Meiri et al. |
| 8,996,460 B1 | 3/2015 | Frank et al. |
| 8,996,461 B1 | 3/2015 | Natanzon et al. |
| 8,996,827 B1 | 3/2015 | Natanzon |
| 9,003,138 B1 | 4/2015 | Natanzon et al. |
| 9,026,696 B1 | 5/2015 | Natanzon et al. |
| 9,031,913 B1 | 5/2015 | Natanzon |
| 9,032,160 B1 | 5/2015 | Natanzon et al. |
| 9,037,818 B1 | 5/2015 | Natanzon et al. |
| 9,063,994 B1 | 6/2015 | Natanzon et al. |
| 9,069,479 B1 | 6/2015 | Natanzon |
| 9,069,709 B1 | 6/2015 | Natanzon et al. |
| 9,081,754 B1 | 7/2015 | Natanzon et al. |
| 9,081,842 B1 | 7/2015 | Natanzon et al. |
| 9,087,008 B1 | 7/2015 | Natanzon |
| 9,087,112 B1 | 7/2015 | Natanzon et al. |
| 9,104,529 B1 | 8/2015 | Derbeko et al. |
| 9,110,914 B1 | 8/2015 | Frank et al. |
| 9,116,811 B1 | 8/2015 | Derbeko et al. |
| 9,128,628 B1 | 9/2015 | Natanzon et al. |
| 9,128,855 B1 | 9/2015 | Natanzon et al. |
| 9,134,914 B1 | 9/2015 | Derbeko et al. |
| 9,135,119 B1 | 9/2015 | Natanzon et al. |
| 9,135,120 B1 | 9/2015 | Natanzon |
| 9,146,878 B1 | 9/2015 | Cohen et al. |
| 9,152,339 B1 | 10/2015 | Cohen et al. |
| 9,152,578 B1 | 10/2015 | Saad et al. |
| 9,152,814 B1 | 10/2015 | Natanzon |
| 9,158,578 B1 | 10/2015 | Derbeko et al. |
| 9,158,630 B1 | 10/2015 | Natanzon |
| 9,160,526 B1 | 10/2015 | Raizen et al. |
| 9,177,670 B1 | 11/2015 | Derbeko et al. |
| 9,189,339 B1 | 11/2015 | Cohen et al. |
| 9,189,341 B1 | 11/2015 | Natanzon et al. |
| 9,201,736 B1 | 12/2015 | Moore et al. |
| 9,223,659 B1 | 12/2015 | Natanzon et al. |
| 9,225,529 B1 | 12/2015 | Natanzon et al. |
| 9,235,481 B1 | 1/2016 | Natanzon et al. |
| 9,235,524 B1 | 1/2016 | Derbeko et al. |
| 9,235,632 B1 | 1/2016 | Natanzon |

(56) References Cited

U.S. PATENT DOCUMENTS

| | | |
|---|---|---|
| 9,244,997 B1 | 1/2016 | Natanzon et al. |
| 9,256,605 B1 | 2/2016 | Natanzon |
| 9,274,718 B1 | 3/2016 | Natanzon et al. |
| 9,275,063 B1 | 3/2016 | Natanzon |
| 9,286,052 B1 | 3/2016 | Solan et al. |
| 9,305,009 B1 | 4/2016 | Bono et al. |
| 9,323,750 B2 | 4/2016 | Natanzon et al. |
| 9,330,155 B1 | 5/2016 | Bono et al. |
| 9,336,094 B1 | 5/2016 | Wolfson et al. |
| 9,336,230 B1 | 5/2016 | Natanzon |
| 9,367,260 B1 | 6/2016 | Natanzon |
| 9,378,096 B1 | 6/2016 | Erel et al. |
| 9,378,219 B1 | 6/2016 | Bono et al. |
| 9,378,261 B1 | 6/2016 | Bono et al. |
| 9,383,937 B1 | 7/2016 | Frank et al. |
| 9,389,800 B1 | 7/2016 | Natanzon et al. |
| 9,405,481 B1 | 8/2016 | Cohen et al. |
| 9,405,684 B1 | 8/2016 | Derbeko et al. |
| 9,405,765 B1 | 8/2016 | Natanzon |
| 9,411,535 B1 | 8/2016 | Shemer et al. |
| 9,459,804 B1 | 10/2016 | Natanzon et al. |
| 9,460,028 B1 | 10/2016 | Raizen et al. |
| 9,471,579 B1 | 10/2016 | Natanzon |
| 9,477,407 B1 | 10/2016 | Marshak et al. |
| 9,501,542 B1 | 11/2016 | Natanzon |
| 9,507,732 B1 | 11/2016 | Natanzon et al. |
| 9,507,845 B1 | 11/2016 | Natanzon et al. |
| 9,514,138 B1 | 12/2016 | Natanzon et al. |
| 9,524,218 B1 | 12/2016 | Veprinsky et al. |
| 9,529,885 B1 | 12/2016 | Natanzon et al. |
| 9,535,800 B1 | 1/2017 | Natanzon et al. |
| 9,535,801 B1 | 1/2017 | Natanzon et al. |
| 9,547,459 B1 | 1/2017 | BenHanokh et al. |
| 9,547,591 B1 | 1/2017 | Natanzon et al. |
| 9,552,405 B1 | 1/2017 | Moore et al. |
| 9,557,921 B1 | 1/2017 | Cohen et al. |
| 9,557,925 B1 | 1/2017 | Natanzon |
| 9,563,517 B1 | 2/2017 | Natanzon et al. |
| 9,563,684 B1 | 2/2017 | Natanzon et al. |
| 9,575,851 B1 | 2/2017 | Natanzon et al. |
| 9,575,857 B1 | 2/2017 | Natanzon |
| 9,575,894 B1 | 2/2017 | Natanzon et al. |
| 9,582,382 B1 | 2/2017 | Natanzon et al. |
| 9,588,703 B1 | 3/2017 | Natanzon et al. |
| 9,588,847 B1 | 3/2017 | Natanzon et al. |
| 9,594,822 B1 | 3/2017 | Natanzon et al. |
| 9,600,377 B1 | 3/2017 | Cohen et al. |
| 9,619,255 B1 | 4/2017 | Natanzon |
| 9,619,256 B1 | 4/2017 | Natanzon et al. |
| 9,619,264 B1 | 4/2017 | Natanzon et al. |
| 9,619,543 B1 | 4/2017 | Natanzon et al. |
| 9,632,881 B1 | 4/2017 | Natanzon |
| 9,639,295 B1 | 5/2017 | Natanzon et al. |
| 9,639,383 B1 | 5/2017 | Natanzon |
| 9,639,592 B1 | 5/2017 | Natanzon et al. |
| 9,652,333 B1 | 5/2017 | Bournival et al. |
| 9,658,929 B1 | 5/2017 | Natanzon et al. |
| 9,659,074 B1 | 5/2017 | Natanzon et al. |
| 9,665,305 B1 | 5/2017 | Natanzon et al. |
| 9,668,704 B2 | 6/2017 | Fuimaono et al. |
| 9,672,117 B1 | 6/2017 | Natanzon et al. |
| 9,678,680 B1 | 6/2017 | Natanzon et al. |
| 9,678,728 B1 | 6/2017 | Shemer et al. |
| 9,684,576 B1 | 6/2017 | Natanzon et al. |
| 9,690,504 B1 | 6/2017 | Natanzon et al. |
| 9,696,939 B1 | 7/2017 | Frank et al. |
| 9,710,177 B1 | 7/2017 | Natanzon |
| 9,720,618 B1 | 8/2017 | Panidis et al. |
| 9,722,788 B1 | 8/2017 | Natanzon et al. |
| 9,727,429 B1 | 8/2017 | Moore et al. |
| 9,733,969 B2 | 8/2017 | Derbeko et al. |
| 9,737,111 B2 | 8/2017 | Lustik |
| 9,740,572 B1 | 8/2017 | Natanzon et al. |
| 9,740,573 B1 | 8/2017 | Natanzon |
| 9,740,880 B1 | 8/2017 | Natanzon et al. |
| 9,749,300 B1 | 8/2017 | Cale et al. |
| 9,767,111 B1 | 9/2017 | Natanzon |
| 9,772,789 B1 | 9/2017 | Natanzon et al. |
| 9,798,472 B1 | 10/2017 | Natanzon et al. |
| 9,798,490 B1 | 10/2017 | Natanzon |
| 9,804,934 B1 | 10/2017 | Natanzon et al. |
| 9,811,431 B1 | 11/2017 | Natanzon et al. |
| 9,823,865 B1 | 11/2017 | Natanzon et al. |
| 9,823,973 B1 | 11/2017 | Natanzon |
| 9,832,261 B2 | 11/2017 | Don et al. |
| 9,846,698 B1 | 12/2017 | Panidis et al. |
| 9,875,042 B1 | 1/2018 | Natanzon et al. |
| 9,875,162 B1 | 1/2018 | Panidis et al. |
| 9,880,777 B1 | 1/2018 | Bono et al. |
| 9,881,014 B1 | 1/2018 | Bono et al. |
| 9,910,620 B1 | 3/2018 | Veprinsky et al. |
| 9,910,621 B1 | 3/2018 | Golan et al. |
| 9,910,735 B1 | 3/2018 | Natanzon |
| 9,910,739 B1 | 3/2018 | Natanzon et al. |
| 9,917,854 B2 | 3/2018 | Natanzon et al. |
| 9,921,955 B1 | 3/2018 | Derbeko et al. |
| 9,933,957 B1 | 4/2018 | Cohen et al. |
| 9,934,302 B1 | 4/2018 | Cohen et al. |
| 9,940,205 B2 | 4/2018 | Natanzon |
| 9,940,460 B1 | 4/2018 | Derbeko et al. |
| 9,946,649 B1 | 4/2018 | Natanzon et al. |
| 9,959,061 B1 | 5/2018 | Natanzon et al. |
| 9,965,306 B1 | 5/2018 | Natanzon et al. |
| 9,990,256 B1 | 6/2018 | Natanzon |
| 9,996,539 B1 | 6/2018 | Natanzon |
| 10,007,626 B1 | 6/2018 | Saad et al. |
| 10,019,194 B1 | 7/2018 | Baruch et al. |
| 10,025,931 B1 | 7/2018 | Natanzon et al. |
| 10,031,675 B1 | 7/2018 | Veprinsky et al. |
| 10,031,690 B1 | 7/2018 | Panidis et al. |
| 10,031,692 B2 | 7/2018 | Elron et al. |
| 10,031,703 B1 | 7/2018 | Natanzon et al. |
| 10,037,251 B1 | 7/2018 | Bono et al. |
| 10,042,579 B1 | 8/2018 | Natanzon |
| 10,042,751 B1 | 8/2018 | Veprinsky et al. |
| 10,055,146 B1 | 8/2018 | Natanzon et al. |
| 10,055,148 B1 | 8/2018 | Natanzon et al. |
| 10,061,666 B1 | 8/2018 | Natanzon et al. |
| 10,067,694 B1 | 9/2018 | Natanzon et al. |
| 10,067,837 B1 | 9/2018 | Natanzon et al. |
| 10,078,459 B1 | 9/2018 | Natanzon et al. |
| 10,082,980 B1 | 9/2018 | Cohen et al. |
| 10,083,093 B1 | 9/2018 | Natanzon et al. |
| 10,095,489 B1 | 10/2018 | Lieberman et al. |
| 10,101,943 B1 | 10/2018 | Ayzenberg et al. |
| 2002/0129168 A1 | 9/2002 | Kanai et al. |
| 2003/0048842 A1 | 3/2003 | Fourquin et al. |
| 2003/0061537 A1 | 3/2003 | Cha et al. |
| 2003/0110278 A1 | 6/2003 | Anderson |
| 2003/0145317 A1 | 7/2003 | Chamberlain |
| 2003/0196147 A1 | 10/2003 | Hirata et al. |
| 2004/0205092 A1 | 10/2004 | Longo et al. |
| 2004/0250032 A1 | 12/2004 | Ji et al. |
| 2004/0254964 A1 | 12/2004 | Kodama et al. |
| 2005/0015663 A1 | 1/2005 | Armangau et al. |
| 2005/0028022 A1 | 2/2005 | Amano |
| 2005/0049924 A1 | 3/2005 | DeBettencourt et al. |
| 2005/0172092 A1 | 8/2005 | Lam et al. |
| 2005/0273655 A1 | 12/2005 | Chow et al. |
| 2006/0031647 A1 | 2/2006 | Hirakawa et al. |
| 2006/0047996 A1 | 3/2006 | Anderson et al. |
| 2006/0064416 A1 | 3/2006 | Sim-Tang |
| 2006/0107007 A1 | 5/2006 | Hirakawa et al. |
| 2006/0117211 A1 | 6/2006 | Matsunami et al. |
| 2006/0161810 A1 | 7/2006 | Bao |
| 2006/0179343 A1 | 8/2006 | Kitamura |
| 2006/0195670 A1 | 8/2006 | Iwamura et al. |
| 2007/0055833 A1 | 3/2007 | Vu et al. |
| 2007/0180304 A1 | 8/2007 | Kano |
| 2007/0198602 A1 | 8/2007 | Ngo et al. |
| 2007/0198791 A1 | 8/2007 | Iwamura et al. |
| 2007/0226535 A1* | 9/2007 | Gokhale ............ G06F 11/1435 714/6.12 |
| 2008/0010422 A1 | 1/2008 | Suzuki et al. |

(56) References Cited

U.S. PATENT DOCUMENTS

| | | | |
|---|---|---|---|
| 2008/0082592 A1* | 4/2008 | Ahal | G06F 11/2066 |
| 2009/0037608 A1 | 2/2009 | Lubbers et al. | |
| 2010/0281215 A1 | 11/2010 | Pidapa | |
| 2012/0254535 A1 | 10/2012 | Hay et al. | |
| 2013/0054529 A1 | 2/2013 | Wang et al. | |
| 2015/0039815 A1 | 2/2015 | Klein | |
| 2016/0202925 A1 | 7/2016 | Dain et al. | |

OTHER PUBLICATIONS

Soules et al., "Metadata Efficiency in Versioning File Systems;" 2$^{nd}$ USENIX Conference on File and Storage Technologies; Mar. 31, 2003-Apr. 2, 2003; 16 Pages.

AIX System Management Concepts: Operating Systems and Devices; Bull Electronics Angers; May 2000; 280 Pages.

Soules et al., "Metadata Efficiency in a Comprehensive Versioning File System;" May 2002, CMU-CS-02-145; School of Computer Science, Carnegie Mellon University; 33 Pages.

"Linux Filesystems," Sams Publishing; 2002; Chapter 1: Introducing to Filesytems pp. 17-22 and Chapter 3; Overview of Journaling Filesystems pp. 67-71, 12 Pages.

Bunyan et al., "Multiplexing in a BrightStor® ARCserve® Backup Release 11;" Mar. 2004; 4 Pages.

Marks, "Network Computing, 33;" Cover Story; Feb. 2, 2006; 8 Pages.

Hill, "Network Computing, NA;" Cover Story; Jun. 8, 2006; 9 Pages.

Microsoft Computer Dictionary, Fifth Edition; 2002; 3 Pages.

Wikipedia; Retrieved on Mar. 29, 2011 from http://en.wikipedia.org/wiki/deflate: Deflate; 6 Pages.

Wikipedia; Retrieved on Mar. 29, 2011 from http://en.wikipedia.org/wiki/Huffman coding: Huffman Coding; 11 Pages.

Wikipedia; Retrieved on Mar. 29, 2011 from http:///en.wikipedia.org/wiki/LZ77: LZ77 and LZ78; 2 Pages.

U.S. Appl. No. 11/609,560.
U.S. Appl. No. 12/057,652.
U.S. Appl. No. 11/609,561.
U.S. Appl. No. 11/356,920.
U.S. Appl. No. 10/512,687.
U.S. Appl. No. 11/536,233.
U.S. Appl. No. 11/536,215.
U.S. Appl. No. 11/536,160.
U.S. Appl. No. 11/964,168.

U.S. Non-Final Office Action dated Feb. 16, 2018 for U.S. Appl. No. 15/085,148; 17 Pages.

Response to U.S. Non-Final Office Action dated Feb. 16, 2018 for U.S. Appl. No. 15/085,148; Response filed Jun. 12, 2018; 12 Pages.

Non-Final Office Action dated Aug. 24, 2018 for U.S. Appl No. 15/085,148; 31 Pages.

Response to Office Action dated Aug. 24, 2018 for U.S. Appl. No. 15/085,148, filed Nov. 26, 2018; 14 Pages.

* cited by examiner

DISTRIBUTING JOURNAL DATA OVER MULTIPLE JOURNALS

BACKGROUND

Computer data is vital to today's organizations and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Another conventional data protection system uses data replication, by creating a copy of production site data of an organization on a secondary backup storage system, and updating the backup with changes. The backup storage system may be situated in the same physical location as the production storage system, or in a physically remote location. Data replication systems generally operate either at the application level, at the file system level, or at the data block level.

SUMMARY

In one embodiment, a method includes replicating a production volume on a plurality of replica volumes. In an embodiment, each replica volume is stored on a respective storage array with a respective journal. In an embodiment, the replicating includes writing data to a do stream of each journal written to the production volume, reading from the do stream of each journal, reading undo data that will be overwritten by the data in the do stream, distributing the undo data across the journals and writing the data from the do stream from each journal to the respective replica volume. In an embodiment, a number of journals less than a total number of journals can be used to access data in a full journal.

In another embodiment, an apparatus includes electronic hardware circuitry configured to replicate a production volume on a plurality of replica volumes. In an embodiment, each replica volume is stored on a respective storage array with a respective journal. In an embodiment, the circuitry configured to replicate the production volume includes circuitry configured to write data to a do stream of each journal written to the production volume, read from the do stream of each journal, read undo data that will be overwritten by the data in the do stream, distribute the undo data across the journals and write the data from the do stream from each journal to the respective replica volume. In an embodiment, a number of journals less than a total number of journals can be used to access data in a full journal.

In a further embodiment, an article includes a non-transitory computer-readable medium that stores computer-executable instructions. In an embodiment, the instructions cause a machine to replicate a production volume on a plurality of replica volumes. In an embodiment, each replica volume is stored on a respective storage array with a respective journal. In an embodiment, the instructions causing the machine to replicate the production volume includes instructions causing the machine to write data to a do stream of each journal written to the production volume, read from the do stream of each journal, read undo data that will be overwritten by the data in the do stream, distribute the undo data across the journals and write the data from the do stream from each journal to the respective replica volume. In an embodiment, a number of journals less than a total number of journals can be used to access data in a full journal.

DETAILED DESCRIPTION

In some embodiments, the current disclosure may present techniques that may distribute journal data over multiple journals. In one particular example, data may be distributed to the multiple journals using, for example, erasure codes and RAID (Redundant Array of Independent Disks) storage techniques so that a subset of the multiple journals may be used to access data that would be available if a single journal was used.

While certain embodiments herein may describe techniques to replicate a volume, the techniques described herein may be applied to multiple volumes such as, for example, to replicate a logical unit that includes one or more volumes. In one particular example, the techniques described herein may be used to replicate of a virtual machine.

Figure 1:
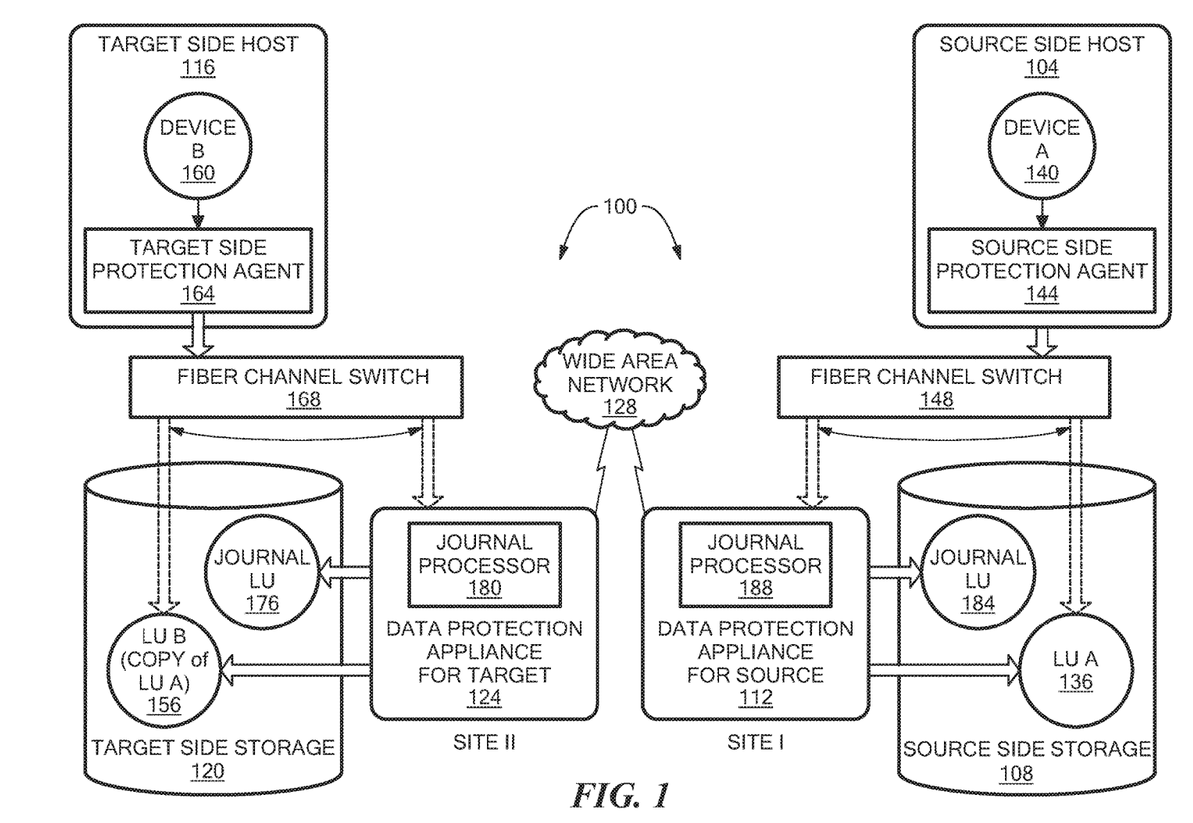
FIG. 1 is a block diagram of an example of a data protection system, according to one embodiment of the disclosure.

Referring to the example embodiment of FIG. 1, according to one embodiment of the disclosure, a data protection system 100 may include two sites; Site I, which may be a production site, and Site II, which may be a backup site or replica site. Under normal operation the production site may be the source side of system 100, and the backup site may be the target side of the system. The backup site may be responsible for replicating production site data. The backup site may enable roll back of Site I data to an earlier pointing time, which may be used in the event of data corruption of a disaster, or alternatively in order to view or to access data from an earlier point in time.

FIG. 1 is an overview of a physical or virtual system for data replication of either physical or virtual logical units. Thus, one of ordinary skill in the art would appreciate that in a virtual environment a hypervisor, in one example, may consume logical units and may generate a distributed file system on the logical units such as VMFS, for example, generates files in the file system and exposes the files as logical units to the virtual machines (each virtual machine disk is seen as a SCSI device by virtual hosts). In another example, the hypervisor may consume a network based file system and exposes files in the NFS as SCSI devices to virtual hosts.

In the example embodiment of FIG. 1, during normal operations, the direction of replicate data flow may go from source side to target side. It is possible, in some embodiments, however, for a user to reverse the direction of replicate data flow, in which case Site I starts to behave as a target backup site, and Site II starts to behave as a source production site. In certain embodiments, change of replication direction may be referred to as a "failover". In many embodiments, a failover may be performed in the event of a disaster at the production site, or for other reasons. In some data architectures, Site I or Site II may behave as a production site for a portion of stored data, and may behave simultaneously as a backup site for another portion of stored data. In some data architectures, a portion of stored data may be replicated to a backup site, and another portion may not.

In certain embodiments, the production site and the backup site may be remote from one another, or they may both be situated at a common site, local to one another. Local data protection has the advantage of minimizing data lag between target and source, and remote data protection has the advantage of being robust in the event that a disaster occurs at the source side.

In the example embodiment of FIG. 1, the source and target sides may communicate via a wide area network (WAN) 128, for example, although other types of networks may be used.

In the example embodiment of FIG. 1, each side of system 100 may include three major components coupled via a storage area network (SAN); namely, (i) a storage system, (ii) a host computer, and (iii) a data protection appliance (DPA). Specifically, with reference to FIG. 1, the source side SAN may include a source host computer 104, a source storage system 108, and a source DPA 112. Similarly, the target side SAN may include a target host computer 116, a target storage system 120, and a target DPA 124. As well, the protection agent (sometimes referred to herein and in the art as a splitter) may run on the host, or on the storage, or in the network or at a hypervisor level, and that DPAs are optional and DPA code may run on the storage array too, or the DPA 124 may run as a virtual machine.

Generally, a SAN may include one or more devices, referred to as "nodes". A node in a SAN may be an "initiator" or a "target", or both. In some embodiments, an initiator node may be a device that is able to initiate requests to one or more other devices; and a target node may be a device that is able to reply to requests, such as SCSI (small computer system interface) commands, sent by an initiator node. In certain embodiments, SAN may also include network switches, such as fiber channel switches. In many embodiments, communication links between each host computer and its corresponding storage system may be any appropriate medium suitable for data transfer, such as fiber communication channel links.

In many embodiments, a host communicates with its corresponding storage system using SCSI commands.

In the example embodiment of FIG. 1, system 100 may include source storage system 108 and target storage system 120. Each storage system may include physical storage units for storing data, such as disks or arrays of disks. Typically, storage systems 108 and 120 may be target nodes. In order to enable initiators to send requests to storage system 108, storage system 108 may expose one or more logical units (LU) to which commands are issued. Thus, storage systems 108 and 120 may be SAN entities that provide multiple logical units for access by multiple SAN initiators.

Logical units may be a logical entity provided by a storage system, for accessing data stored in the storage system. The logical unit may be a physical logical unit or a virtual logical unit. A logical unit may be identified by a unique logical unit number (LUN). Storage system 108 may expose a logical unit 136, designated as LU A, and storage system 120 may expose a logical unit 156, designated as LU B.

LU B may be used for replicating LU A. As such, LU B may be generated as a copy of LU A. In one embodiment, LU B may be configured so that its size is identical to the size of LU A. Thus, in the example embodiment of FIG. 1, for LU A, storage system 120 may serve as a backup for source side storage system 108. Alternatively, in other embodiments, as mentioned hereinabove, some logical units of storage system 120 may be used to back up logical units of storage system 108, and other logical units of storage system 120 may be used for other purposes. Moreover, in certain embodiments, there may be symmetric replication whereby some logical units of storage system 108 may be used for replicating logical units of storage system 120, and other logical units of storage system 120 may be used for replicating other logical units of storage system 108.

In the example embodiment of FIG. 1, system 100 may include a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally, a host computer may run at least one data processing application, such as a database application and an e-mail server.

Generally, an operating system of a host computer may generate a host device for each logical unit exposed by a storage system in the host computer SAN.

In the example embodiment of FIG. 1, a host device may be a logical entity in a host computer, through which a host computer may access a logical unit. Host device 104 may identify LU A and may generate a corresponding host device 140, designated as Device A, through which the host device 104 may access LU A. Similarly, host computer 116 may identify LU B and may generate a corresponding device 160, designated as Device B.

In the example embodiment of FIG. 1, in the course of continuous operation, host computer 104 may be a SAN initiator that issues I/O requests (write/read operations) through host device 140 to LU A using, for example, SCSI commands. An I/O request is an input/output request (sometimes referred to as an I/O), which may be a read I/O request (sometimes referred to as a read request or a read) or a write I/O request (sometimes referred to as a write request or a write). Such requests may be generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); (e.g., 20 blocks). For an I/O rate of 50 megabytes (MB) per second, this corresponds to approximately 5,000 write transactions per second. System 100 may include two data protection appliances, a source side DPA 112 and a target side DPA 124. A DPA may perform various data protection services, such as data replication of a storage system, and journaling of I/O requests issued by a host computer to source side storage system data. As explained in detail herein, when acting as a target side DPA, a DPA may also enable roll back of data to an earlier point-in-time (PIT), and processing of rolled back data at the target site. Each DPA 112 and 124 may be a computer that includes inter alia one or more conventional CPUs and internal memory.

For additional safety precaution, each DPA may be a cluster of such computers. Use of a cluster may ensure that if a DPA computer is down, then the DPA functionality switches over to another computer. The DPA computers within a DPA cluster may communicate with one another using at least one communication link suitable for data transfer via fiber channel or IP based protocols, or such other transfer protocol. One computer from the DPA cluster may serve as the DPA leader. The DPA cluster leader may coordinate between the computers in the cluster, and may also perform other tasks that require coordination between the computers, such as load balancing.

In the architecture illustrated in FIG. 1, DPA 112 and DPA 124 may be standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands or any other protocol.

DPAs 112 and 124 may be configured to act as initiators in the SAN (e.g., DPAs may issue I/O requests using, for example, SCSI commands, to access logical units on their respective storage systems). DPA 112 and DPA 124 may also be configured with the necessary functionality to act as targets (e.g., to reply to I/O requests, such as SCSI commands, issued by other initiators in the SAN, including inter alia their respective host computers 104 and 116). Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units, and as a target DPA for other logical units, at the same time.

Host computer 104 and host computer 116 may include protection agents 144 and 164, respectively. Protection agents 144 and 164 intercept SCSI commands issued by their respective host computers, via host devices to logical units that are accessible to the host computers. A data protection agent may act on an intercepted SCSI commands issued to a logical unit, in one of the following ways: send the SCSI commands to its intended logical unit; redirect the SCSI command to another logical unit; split the SCSI command by sending it first to the respective DPA; after the DPA returns an acknowledgement, send the SCSI command to its intended logical unit; fail a SCSI command by returning an error return code; and delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. Protection agents communicate with their respective DPAs by sending SCSI commands over fiber channel.

Protection agents 144 and 164 may be drivers located in their respective host computers 104 and 116. Alternatively, a protection agent may also be located in a fiber channel switch, or in any other device situated in a data path between a host computer and a storage system or on the storage system itself. In a virtualized environment, the protection agent may run at the hypervisor layer or in a virtual machine providing a virtualization layer.

What follows is a detailed description of system behavior under normal production mode, and under recovery mode.

In production mode DPA 112 may act as a source site DPA for LU A. Thus, protection agent 144 may be configured to act as a source side protection agent (e.g., as a splitter for host device A). Specifically, protection agent 144 may replicate SCSI I/O write requests. A replicated SCSI I/O write request may be sent to DPA 112. After receiving an acknowledgement from DPA 124, protection agent 144 then may send the SCSI I/O write request to LU A. After receiving a second acknowledgement from storage system 108 host computer 104 may acknowledge that an I/O command complete.

When DPA 112 receives a replicated SCSI write request from data protection agent 144, DPA 112 may transmit certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 may send each write transaction to DPA 124, may receive back an acknowledgement from DPA 124, and in turns may send an acknowledgement back to protection agent 144. Protection agent 144 may wait until receipt of such acknowledgement before sending the SCSI write request to LU A.

In asynchronous mode, DPA 112 may send an acknowledgement to protection agent 144 upon receipt of each I/O request, before receiving an acknowledgement back from DPA 124.

In snapshot mode, DPA 112 may receive several I/O requests and combines them into an aggregate "snapshot" of write activity performed in the multiple I/O requests, and may send the snapshot to DPA 124, for journaling and for incorporation in target storage system 120. In snapshot mode DPA 112 may send an acknowledgement to protection agent 144 upon receipt of each I/O request, before receiving an acknowledgement back from DPA 124.

While in production mode, DPA 124 may receive replicated data of LU A from DPA 112, and may perform journaling and writing to storage system 120. When applying write operations to storage system 120, DPA 124 may act as an initiator, and may send SCSI commands to LU B.

During a recovery mode, DPA 124 may undo the write transactions in the journal, so as to restore storage system 120 to the state it was at, at an earlier time.

As described hereinabove, LU B may be used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 may act as a target site protection agent for host Device B and may fail I/O requests sent from host computer 116 to LU B through host Device B.

Target storage system 120 may expose a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 may include a journal processor 180 for managing the journal LU 176.

Journal processor 180 functions generally to manage the journal entries of LU B. Specifically, journal processor 180 may enter write transactions received by DPA 124 from DPA 112 into the journal, by writing them into the journal LU, may read the undo information for the transaction from LU B, may update the journal entries in the journal LU with undo information, applies the journal transactions to LU B, and may remove already-applied transactions from the journal.

Figure 2:
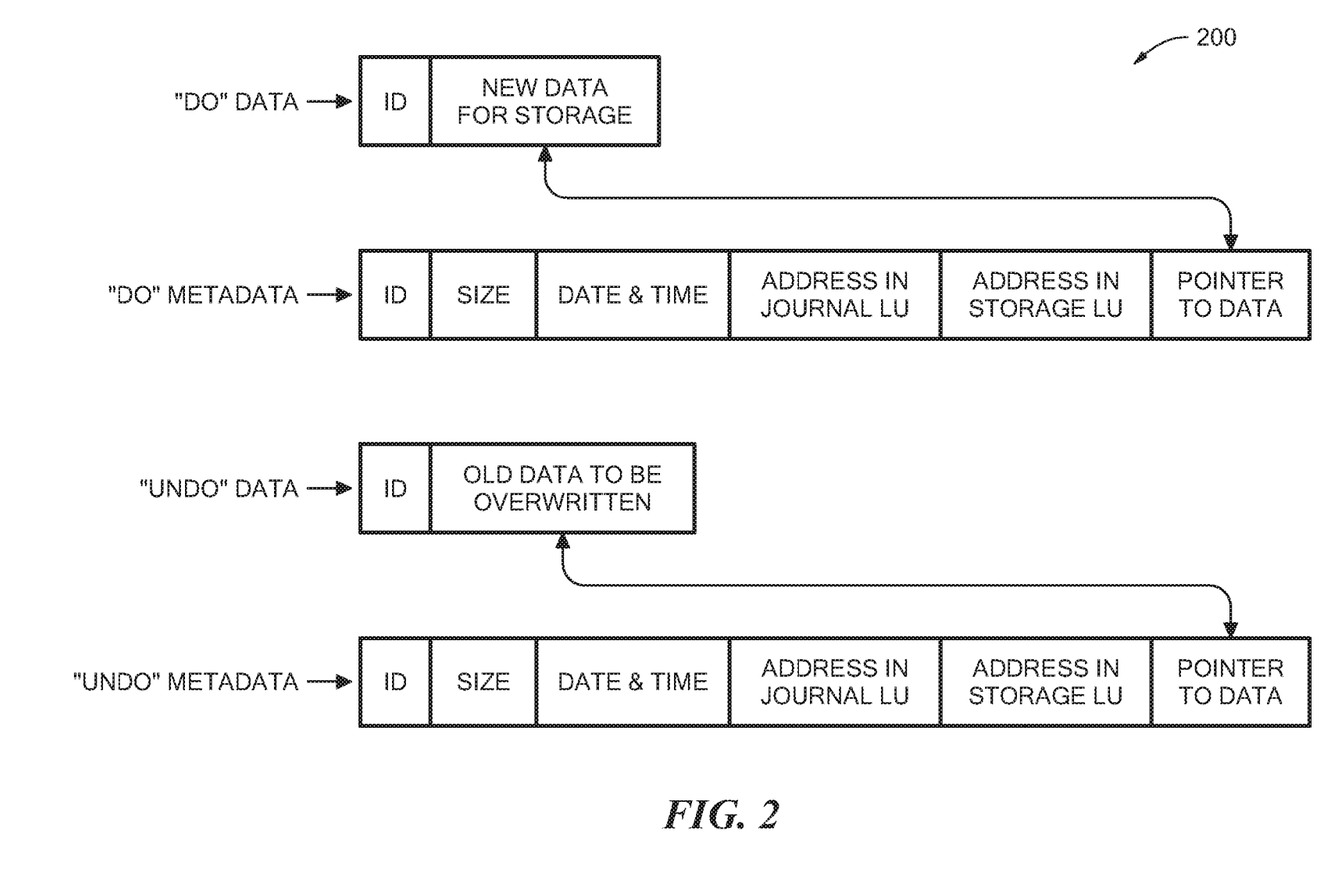
FIG. 2 is an illustration of an example of a journal history of write transactions for a storage system, according to one embodiment of the disclosure.

Referring to the example embodiment of FIG. 2, which is an illustration of a write transaction 200 for a journal. The journal may be used to provide an adaptor for access to storage 120 at the state it was in at any specified point in time. Since the journal contains the "undo" information necessary to roll back storage system 120, data that was stored in specific memory locations at the specified point in time may be obtained by undoing write transactions that occurred subsequent to such point in time.

In one example, a description of journaling and some techniques associated with journaling may be described in the patent titled "METHODS AND APPARATUS FOR OPTIMAL JOURNALING FOR CONTINUOUS DATA REPLICATION" and with U.S. Pat. No. 7,516,287, issued Apr. 7, 2009, which is hereby incorporated by reference.

Referring to the example embodiment of FIG. 2 write transaction 200 generally includes the following fields: one or more identifiers; a time stamp, which is the date & time at which the transaction was received by source side DPA 112; a write size, which is the size of the data block; a location in journal LU 176 where the data is entered; a location in LU B where the data is to be written; and the data itself.

Write transaction 200 may be transmitted from source side DPA 112 to target side DPA 124. As shown in FIG. 2, DPA 124 may record the write transaction 200 in the journal that includes four streams. A first stream, referred to as a DO stream, may include new data for writing in LU B. A second stream, referred to as a DO METADATA stream, may include metadata for the write transaction, such as an identifier, a date & time, a write size, a beginning address in LU B for writing the new data in, and a pointer to the offset in the DO stream where the corresponding data is located. Similarly, a third stream, referred to as an UNDO stream, may include old data that was overwritten in LU B; and a fourth stream, referred to as an UNDO METADATA, may include an identifier, a date & time, a write size, a beginning address in LU B where data was to be overwritten, and a pointer to the offset in the UNDO stream where the corresponding old data is located.

In practice each of the four streams may hold a plurality of write transaction data. As write transactions are received dynamically by target DPA 124, the write transactions may be recorded at the end of the DO stream and the end of the DO METADATA stream, prior to committing the transaction. During transaction application, when the various write transactions are applied to LU B, prior to writing the new DO data into addresses within the storage system, the older data currently located in such addresses may be recorded into the UNDO stream. In some examples, the metadata stream (e.g., UNDO METADATA stream or the DO METADATA stream) and the data stream (e.g., UNDO stream or DO stream) may be kept in a single stream each (i.e., one UNDO data and UNDO METADATA stream and one DO data and DO METADATA stream) by interleaving the metadata into the data stream.

Figure 3A:
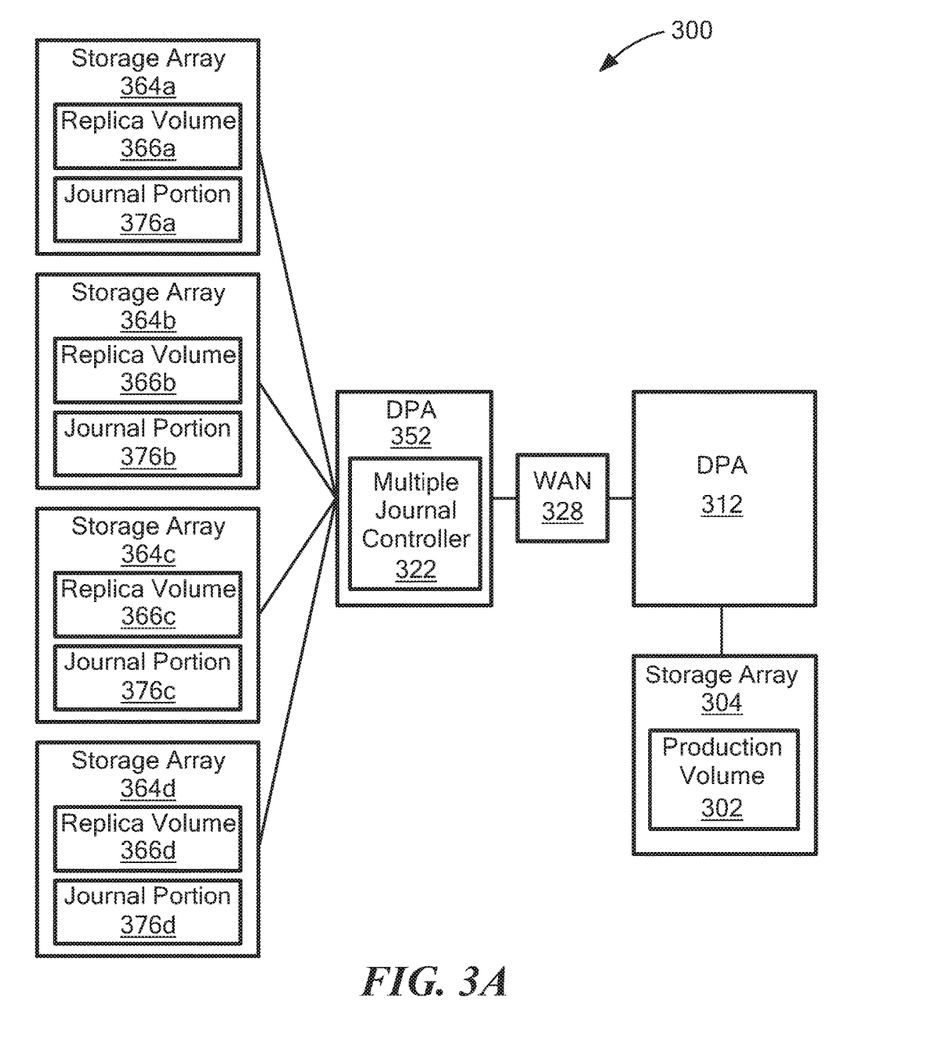
FIG. 3A is a block diagram of an example of a portion of a data protection system configured to distribute journal data over multiple journals, according to one embodiment of the disclosure.

Referring to FIG. 3A, a system 300 is an example of a portion of a data protection system configured to distribute journal data over multiple journals, according to one embodiment of the disclosure.

In one example, the system 300 may include a storage array 304, a DPA 312, a DPA 352 connected to the DPA 312 by a WAN 328 and storage arrays (e.g., storage array 364a-364d). The storage array 304 may include a production volume 302. In one example, the DPAs 312, 352 are similar to DPAs 112, 124, respectively.

Referring to the example embodiment of FIG. 3A, each storage array 364a-364d may include a copy of the production volume 302 (e.g., a storage array 364a may include a replica volume 366a, a storage array 364b may include a replica volume 366b, a storage array 364c may include a replica volume 366c and a storage array 364d may include a replica volume 316d).

Each storage array 364a-364d may include a respective portion of a journal (e.g., the storage array 364a may include a journal portion 376a, the storage array 364b may include a journal portion 376b, the storage array 364c may include a journal portion 376c and the storage array 364d may include a journal portion 376d).

The DPA 352 may include a multiple journal controller 322 configured to distribute journal data over multiple journals (e.g., journal portions 376a-376d). As will be further described herein, rather than save a copy of a full journal on each of the storage arrays 364a-364d, a portion (e.g., journal portions 376a-376d) of the full journal is saved on each storage array 364a-364d so that a subset (e.g., less than a total number) of the journal portions 376a-376d may be used to access the data that would have been available in a full journal and roll back any of the replica volumes 366a-366d to a selected point-in-time.

In one example, each of the journal portions 376a-376d may include a DO stream, a DO METADATA stream, an UNDO stream and an UNDO METADATA as described with respect to FIG. 2. As will be further described herein (e.g., with respect to FIG. 5) each of the journal portions 376a-376d may include the same DO and DO METADATA streams, but each of the journal portions 376a-376d may include unique UNDO and UNDO METADATA streams.

In one example, journal data received by the multiple journal controller 322 is sent to journal portions 376a-376d using, for example, erasure codes, RAID (Redundant Array of Independent Disks) and so forth. In one particular example, the techniques to distribute journal data may be similar to approaches described in U.S. Pat. No. 9,063,910, issued Jun. 23, 2015, entitled "DATA RECOVERY AFTER TRIPLE DISK FAILURE;" U.S. Pat. No. 9,026,729, issued May 5, 2015, entitled "DATA RECOVERY AFTER TRIPLE DISK FAILURE;" and U.S. Pat. No. 8,990,495, issued Mar. 24, 2015, entitled "METHOD AND SYSTEM FOR STORING DATA IN RAID MEMORY DEVICES," each of which are assigned to the same assignee as the present patent application. All applications in this paragraph are incorporated herein by reference in their entirety.

In one particular example, journal portions 376a-376d may be used to access data that in a full journal under (4,2) MDS (maximum distance separable) erasure code (i.e., at least two journal portions of the four journal portions may be used to access data that would be in a full journal).

Figure 3B:
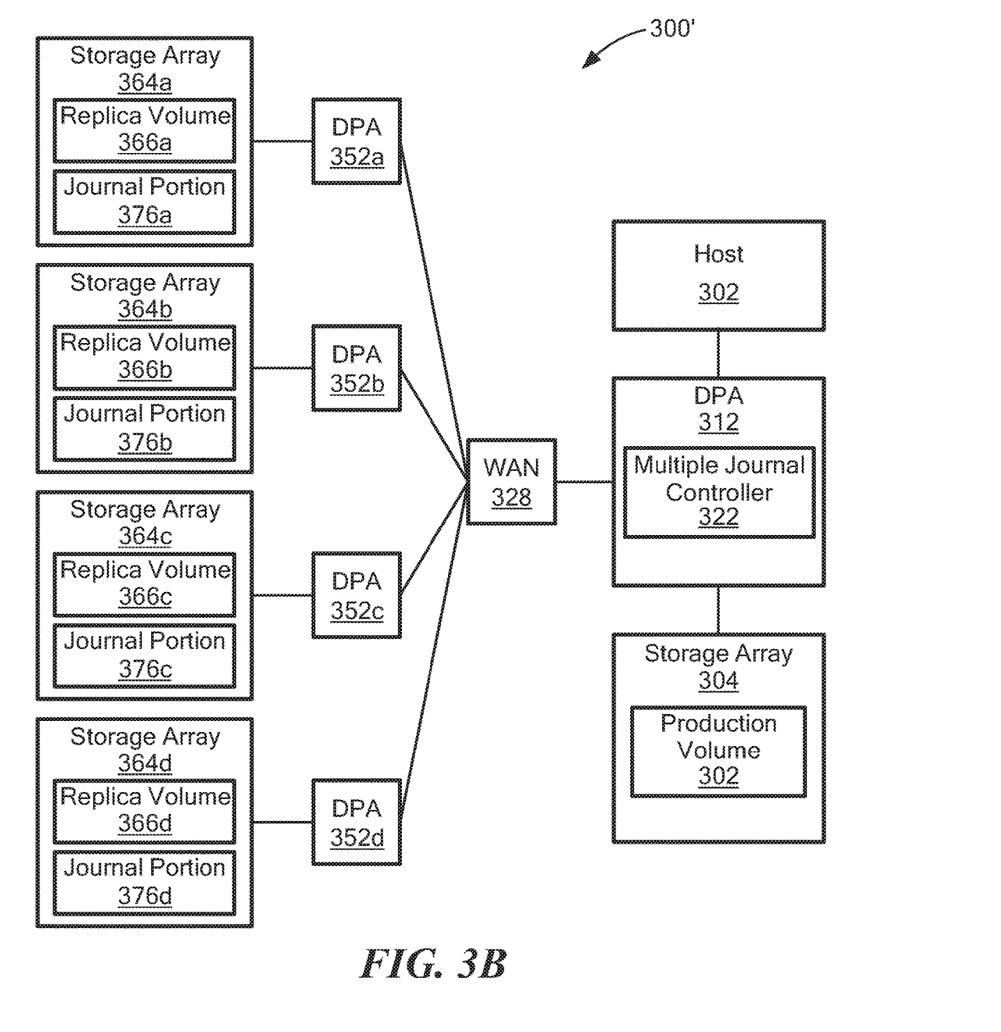
FIG. 3B is a block diagram of another example of a data protection system configured to distribute journal data over multiple journals, according to one embodiment of the disclosure.

Referring to FIG. 3B, a system 300' is another example of a system to distribute journal data over multiple journals, according to one embodiment of the disclosure. The system 300' is similar to the system 300 except, for example, the DPA 352 is replaced with DPAs 352a-352d. In another example, the DPAs 352a-352d may be located at different sites. In one example, a site may be a cloud network or other storage network. The multiple journal controller 322 may be disposed at the production DPA 312. In other examples, each of the DPAs 352a-352d may include a multiple journal controller.

Figure 4:
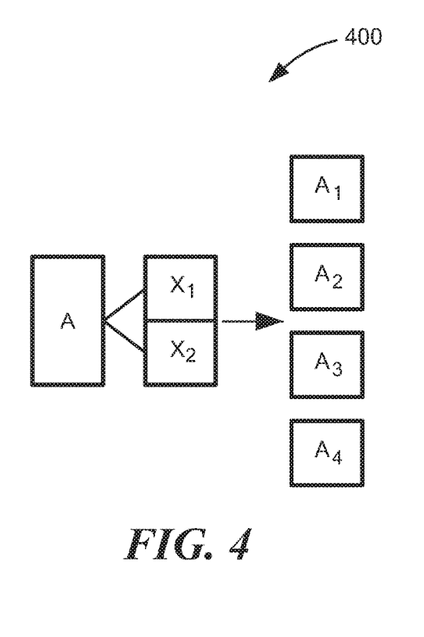
FIG. 4 is a simplified block diagram of one particular example to distribute journal data over multiple journals, according to one embodiment of the disclosure.

Referring to FIG. 4, a diagram 400 is a simplified block diagram of one particular example to distribute journal data over multiple journals, according to one embodiment of the disclosure. In one particular example, a block of data, A, represents a block of undo data read from one of the replica volumes 366a-366d. The block of data, A, may be split into two equal data portions, $X_1$ and $X_2$. In one particular example of using erasure codes, data $A_1$ may be equal to data portion $X_1$, data $A_2$ may be equal to data portion $X_2$, data $A_3$ may be equal to data portion $X_1$, and $X_2$, data $A_2$ may be equal to data portion $X_1$ plus two times $X_2$.

In one particular example, the data $A_1$ is sent to the journal portion 376a, the data $A_2$ is sent to the journal portion 376b, the data $A_3$ is sent to the journal portion 376c and the data $A_4$ is sent to the journal portion 376d.

Figure 5:
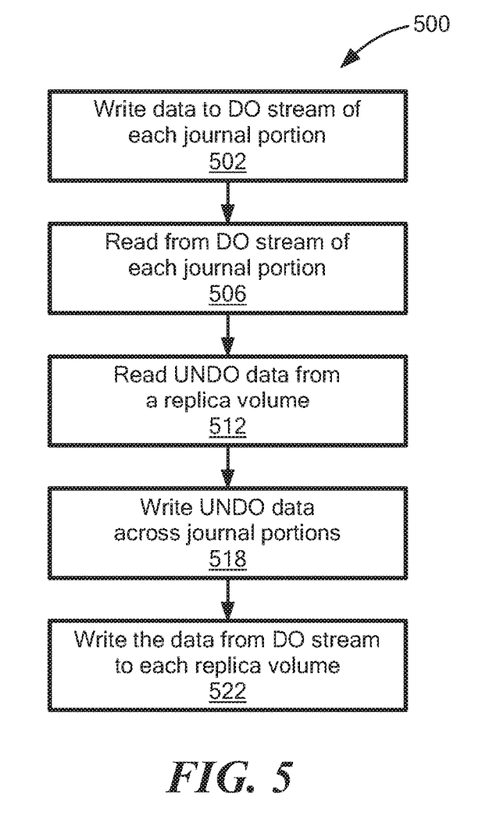
FIG. 5 is a flowchart of an example of a process to distribute journal data over multiple journals, according to one embodiment of the disclosure.

Referring to FIG. 5, a process 500 is an example of a process to distribute journal data over multiple journals, according to one embodiment of the disclosure.

Process 500 writes data to DO stream of each journal portion (502). For example, each of the DO streams of journal portions 376a-376d may receive data, which was already written to the production volume 302. The data received may be written to their respective replica volume 366a-366d. In other examples, the metadata associated with the data may be written to the DO METADATA stream of each of the journal portions 376a-376d.

Process 500 may read from the DO stream of each journal portion (506). For example, the data and metadata from the DO and DO METADATA streams, respectively, may be read from the journal portions 376a-376d.

Process 500 may read UNDO data from a replica volume (512). For example, the data that will be overwritten in one of the replica volumes 366a-366d may be read.

Process 500 may write UNDO data across journal portions (518). For example, the undo data may be received by the multiple journal controller 322 and is sent to journal portions 376a-376d using, for example, erasure codes, RAID (Redundant Array of Independent Disks) and so forth.

Process 500 may write the data from the DO stream to each replica volume (522). For example, after the data from the DO stream of each journal portion 376a-376d may be written to its respective replica volume 366a-366d.

Figure 6:
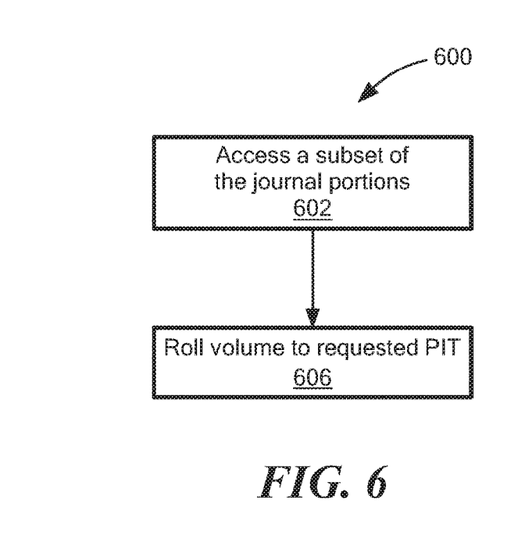
FIG. 6 is a flowchart of an example of a process to restore a volume using multiple journals, according to one embodiment of the disclosure.

Referring to FIG. 6, a process 600 is an example of a process to restore a volume using multiple journals, according to one embodiment of the disclosure.

Process 600 may access a subset of journal portions (602). For example, the multiple journal controller 322 may receive a request to access a selected point-in-time and may access a number of journal portions required to access a selected point-in-time.

Process 600 rolls volume to requested point-in-time using a subset of the journal portions (606). For example, the multiple journal controller 322 accesses one of the replica volumes 366a-366d and rolls back the accessed replica volume to the selected point-in-time (PIT) by undoing the write transactions in the subset of journal portions.

Figure 7:
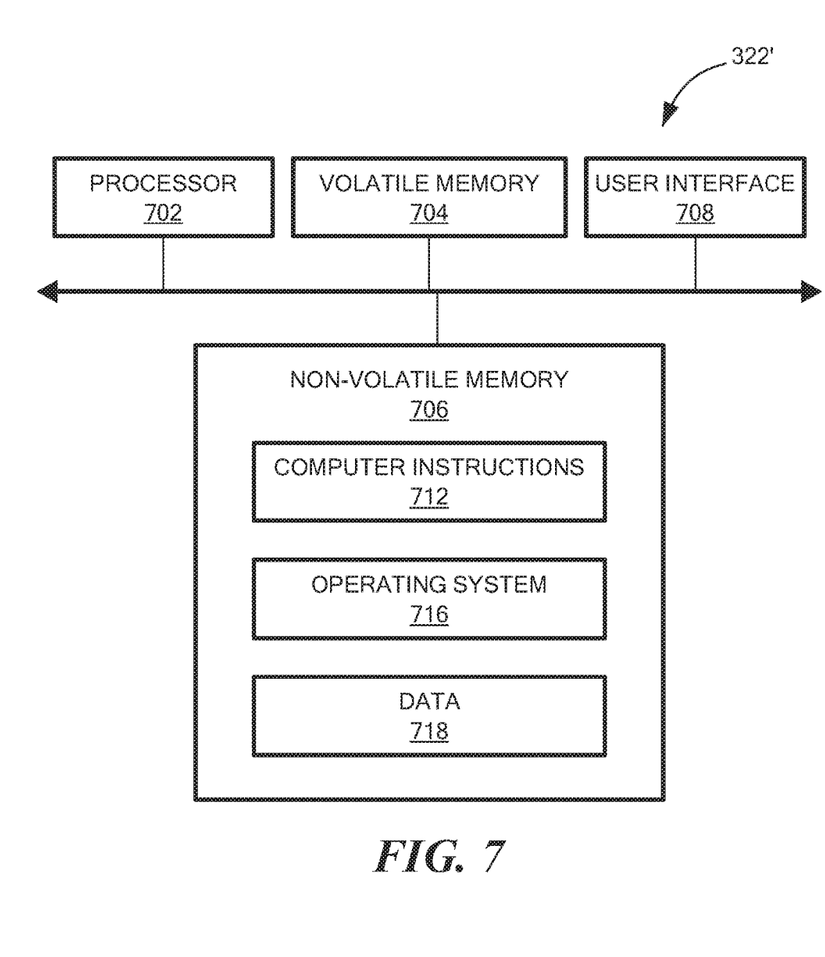
FIG. 7 is a computer on which any portion of the processes of FIGS. 5 and 6 may be implemented, according to one embodiment of the disclosure.

Referring to FIG. 7, in one example, the multiple journal controller 322 may be the multiple journal controller 322'. The multiple journal controller 322' may include a processor 702, a volatile memory 704, a non-volatile memory 706 (e.g., hard disk, flash memory) and the user interface (UI) 708 (e.g., a graphical user interface, a mouse, a keyboard, a display, touch screen and so forth). The non-volatile memory 706 may store computer instructions 712, an operating system 716 and data 718. In one example, the computer instructions 712 may be executed by the processor 702 out of volatile memory 704 to perform at least a portion of the processes described herein (e.g., processes 500 and 600).

The processes described herein (e.g., processes 500 and 600) are not limited to use with the hardware and software of FIG. 7; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the processes 500 and 600 are not limited to the specific processing order of FIGS. 5 and 6. Rather, any of the processing blocks of FIGS. 5 and 6 may be re-ordered, combined or removed, performed in parallel or in serial, as necessary, to achieve the results set forth above.

The processing blocks (for example, in the processes 500 and 600) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic device or a logic gate.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A method for use in a storage system including a replication subsystem having a plurality of storage arrays, the method comprising:
   replicating a production volume on a plurality of replica volumes, each replica volume being part of a different one of the plurality of storage arrays, the replicating comprising:
      writing data to a plurality of do streams, each do stream being associated with a different one of a plurality of journal portions, each journal portion being stored in a different one of the plurality of storage arrays;
      reading undo data that will be overwritten by the data in the plurality of do streams, the undo data being read from at least one of the replication volumes;
      distributing the undo data across the plurality of journal portions; and
      writing the data from the plurality of do streams to the plurality of replica volumes, such that any respective portion of the data that is stored in any given one of the plurality of do streams is stored in the replica volume that is part of the same storage array as the given do stream's associated journal portion,
      wherein the plurality of journal portions form a journal, the journal being configured such that fewer than all journal portions in the plurality of journal portions are sufficient to retrieve any data item that is stored in the journal.

2. The method of claim 1, wherein distributing the undo data across the plurality of journal portions comprises distributing the undo data across the plurality of journal portions using erasure codes.

3. The method of claim 1, wherein distributing the undo data across the plurality of journal portions comprises distributing the undo data across the journal portions using RAID (Redundant Array of Independent Disks).

4. The method of claim 1, wherein reading the undo data comprises reading undo data from only one of the replica volumes.

5. The method of claim 1, further comprising undoing one or more write transactions to place one of the replica volumes to a selected point-in-time by using only some of the plurality of journal portions.

6. An apparatus, comprising:
   electronic hardware circuitry configured to:
      replicate a production volume on a plurality of replica volumes, each replica volume being part of a different one of a plurality of storage arrays;
   wherein the circuitry configured to replicate the production volume comprises circuitry configured to:
      write data to a plurality of do streams, each do stream being associated with a different one of a plurality of journal portions, each journal portion being stored in a different one of the plurality of storage arrays;
      read undo data that will be overwritten by the data in the plurality of do streams, the undo data being read from at least one of the replication volumes;
      distribute the undo data across the plurality of journal portions; and
      write the data from the plurality of do streams to the plurality of replica volumes, such that any respective portion of the data that is stored in any given one of the plurality of do streams is stored in the replica volume that is part of the same storage array as the given do stream's associated journal portion,
   wherein the plurality of journal portions form a journal, the journal being configured such that fewer than all journal portions in the plurality of journal portions are sufficient to retrieve any data item that is stored in the journal.

7. The apparatus of claim 6, wherein the circuitry comprises at least one of a processor, a memory, a programmable logic device or a logic gate.

8. The apparatus of claim 6, wherein the circuitry configured to distribute the undo data across the plurality of journal portions comprises circuitry configured to distribute the undo data across the plurality of journal portions using erasure codes.

9. The apparatus of claim 6, wherein the circuitry configured to distribute the undo data across the plurality of journal portions comprises circuitry configured to distribute the undo data across the plurality of journal portions using RAID (Redundant Array of Independent Disks).

10. The apparatus of claim 6, wherein the circuitry configured to read the undo data comprises circuitry configured to read undo data from only one of the replica volumes.

11. The apparatus of claim 6, further comprising circuitry configured to undo one or more write transactions to place one of the replica volumes in a selected point-in-time by using only some of the plurality of journal portions.

12. An article comprising:
    a non-transitory computer-readable medium that stores computer-executable instructions, which when executed by one or more processors cause the one or more processors to:

replicate a production volume on a plurality of replica volumes, each replica volume being part of a different a different one of a plurality of storage arrays, the replication comprising:

write data to a plurality of do stream, each do stream being associated with a different one of a plurality of journal portions, each journal portion being stored in a different one of the plurality of storage arrays;

read undo data that will be overwritten by the data in the plurality of do streams, the undo data being read from at least one of the replication volumes;

distribute the undo data across the plurality of journal portions; and write the data from the plurality of do streams to the plurality of replica volumes, such that any respective portion of the data that is stored in any given one of the plurality of do streams is stored in the replica volume that is part of the same storage array as the given do stream's associated journal portion, wherein the plurality of journal portions form a journal, the journal being configured such that fewer than all journal portions in the plurality of journal portions are sufficient to retrieve any data item that is stored in the journal.

13. The article of claim 12, wherein distributing the undo data across the plurality of journal portions comprises distributing the undo data across the plurality of journal portions using erasure codes.

14. The article of claim 12, wherein distributing the undo data across the plurality of journal portions comprises distributing the undo data across the plurality of journal portions using RAID (Redundant Array of Independent Disks).

15. The article of claim 12, wherein reading the undo data comprises reading the undo data from only one of the replica volumes.

16. The article of claim 12, wherein the one or more processor-executable instructions, when executed by the one or more processors, further cause the one or more processors to undo write transactions to place one of the replica volumes in a selected point-in-time by using only some of the plurality of journal portions.

* * * * *